Dec. 2, 1941.  J. P. GEBELEIN  2,264,691
PHASE POSITION INDICATOR
Filed Oct. 13, 1939
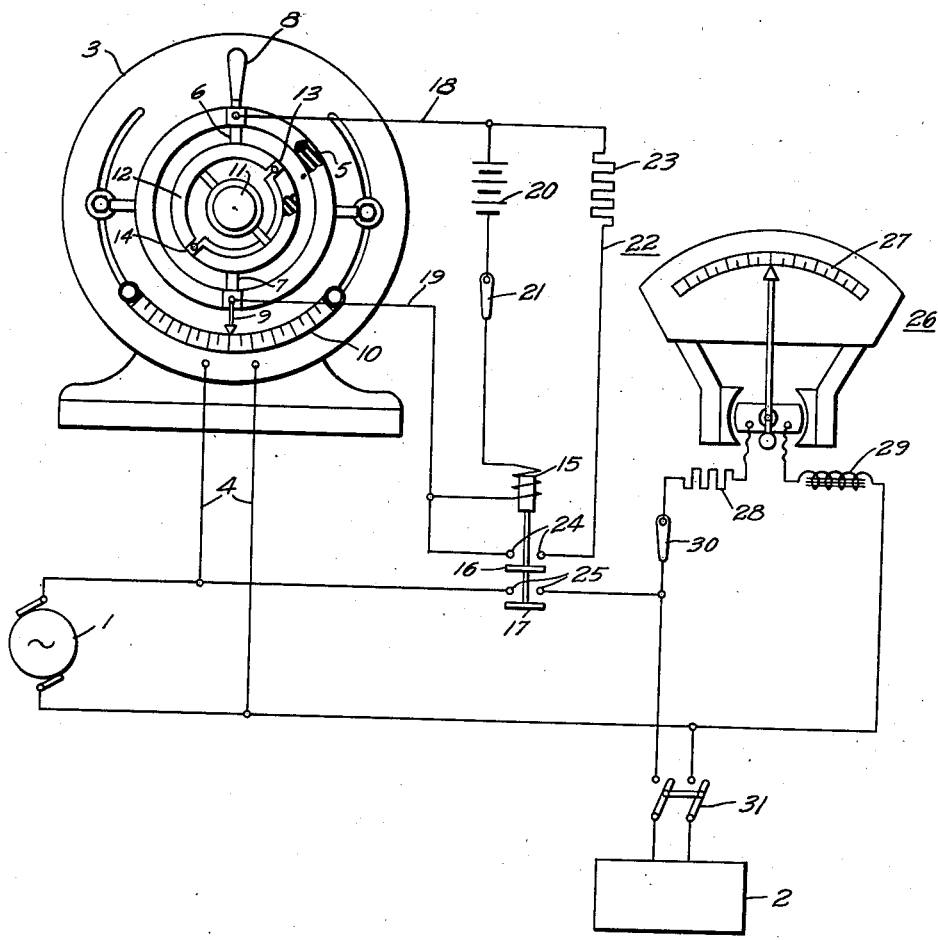
WITNESSES:
C. J. Weller
David Kreider
INVENTOR
John P. Gebelein.
BY
G. R. Saltzman
ATTORNEY Patented Dec. 2, 1941

2,264,691

UNITED STATES PATENT OFFICE 2,264,691

PHASE POSITION INDICATOR

John P. Gebelein, Jackson, Mich., assignor to Westinghouse Electric & Manufacturing Company, East Pittsburgh, Pa., a corporation of Pennsylvania Application October 13, 1939, Serial No. 299,329

3 Claims. (Cl. 175—183)

My invention relates to a phase position indicator and it has particular relation to a device for indicating the point in an alternating-current voltage wave at which a particular operation occurs or is to be performed.

It is, accordingly, an object of my invention to provide apparatus whereby may be determined the point on an alternating-current voltage wave at which an event, as for example, the closing of a circuit breaker, occurs.

Another object of my invention is to provide apparatus which permits the setting of auxiliary equipment so that an event will occur at a certain desired point on the wave.

More specifically stated, it is an object of my invention to provide a phase position indicator which may be used in the testing of electrical apparatus as, for example, safety fuses, to insure successive short circuits occurring at the same point on the alternating-current wave of the test potential.

As is well known in the art, a transient voltage wave occurs in an alternating-current circuit containing impedance upon the circuit being closed or opened. The value of this transient component depends upon the point on the voltage wave at which the operation occurs. A D'Arsonval moving element instrument with suitable ballistic characteristics in series with such a transient circuit consisting of resistance and impedance will give an impulse deflection proportional to the instantaneous voltage at the instant the circuit is closed or opened. This reading will thus provide an indication of the point on the voltage wave at which the operation occurs, and the instrument being of the direct-current type, will not respond to the steady value of the alternating-current voltage.

The phase position indicator of my invention is particularly valuable in making short circuit tests, for example, on plug and cartridge fuses. Such tests will give inconsistent results due to the occurrence of the short circuit at different points on the voltage wave when my invention is not used. With the aid of my invention, however, auxiliary equipment can be so set that the short circuits will always occur at practically the same point on the wave.

Other objects and applications of my invention will become evident from the following detailed description, taken in conjunction with the accompanying drawing, in which the single figure shows diagrammatically a preferred form of the invention applied to apparatus for conducting short circuit tests of electrical equipment.

In the drawing, reference character 1 indicates an alternating-current source from which a predetermined constant voltage may be obtained for supplying energy for the short circuit test of the electrical apparatus 2. Adjustably secured, in any suitable manner, to the housing of a synchronous motor 3 which is energized from the source 1 by leads 4 is a ring 5 of non-conducting material carrying two diametrically opposed stationary but shiftable contacts 6 and 7. A handle 8 is preferably secured to the ring 5 at contact 6 to facilitate adjustment of the position of contacts 6 and 7. Contact 7 carries a pointer 9 cooperating with a scale 10 which is attached to the housing of the motor 3 and is in the form of an arc of ninety geometrical degrees and graduated as shown. This scale 10 is preferably movably supported on the housing of the motor 3. Secured to the shaft 11 of the motor 3 and rotatable therewith is a ring 12 of non-conducting material carrying interconnected diametrically opposed contacts 13 and 14 which will bridge the stationary contacts 6 and 7 twice during each revolution of the shaft 11.

A quick pick-up direct-current relay 15 carrying bridging members 16 and 17 is connected to the stationary contacts 6 and 7 through the leads 18 and 19. Connected in the lead 18 is a battery 20 for energizing the relay 15 and a manually operated switch 21 for opening the relay circuit when desired. Obviously the energizing voltage for the relay may be obtained from some source other than a battery, for example, from the main alternating-current source, in which case relay 15 should be of the alternating-current type. A holding circuit 22 which may contain a resistance 23 is provided with contacts 24 arranged to be bridged by member 16 to retain contact member 17 in a position bridging the main circuit contacts 25.

A D'Arsonval type moving element instrument 26 with suitable ballistic characteristics and having a scale 27 is connected in series with a resistance 28, an inductance 29 and a switch 30 across the supply source 1 through the contacts 25.

A switch 31 may be provided for manually disconnecting the apparatus 2 undergoing test.

For the purpose of illustration my invention is represented diagrammatically in the accompanying drawing. The specific construction of the various elements illustrated is subject to variation and may follow any accepted or conventional practice.

In the operation of the embodiment of my invention which is shown in the drawing, a preliminary run is made with the switch 31 open. The ring 5 is then shifted by means of the handle 8 until the positions of the shiftable contacts 6 and 7 at which the maximum and minimum deflections of the instrument 26 occur are determined. The position of the scale 10 is then adjusted so that the points of maximum and minimum deflection correspond respectively with the zero and ninety degree points thereon. After this adjustment is completed, the instrument 26 may be disconnected from the circuit by opening switch 30 and the relay 15 may be caused to close the test circuit at any desired point on the voltage wave by shifting the stationary contacts 6 and 7 to the desired position on the scale 10.

It will be noted that after the main circuit is closed at the contacts 25 it will be retained in this condition by means of the holding circuit 22 for relay 15. During the testing operation as well as the preliminary run for calibration purposes the relay 15 may be deenergized at any time by opening the normally closed switch 21.

Although I have shown and described a specific embodiment of my invention, I am fully aware that many modifications thereof are possible. My invention, therefore, is not to be restricted except insofar as is necessitated by the prior art and the spirit of the appended claims.

I claim as my invention:

1. In a system for short circuit testing of electrical apparatus, an alternating voltage source, a circuit connecting said apparatus with said voltage source, relay means for controlling the continuity of said circuit, a second circuit for energizing said relay means, a synchronous motor and means for energizing it from said alternating voltage source, a bridging contact secured to the shaft of said motor, a pair of diametrically opposed stationary contacts in circuit with the winding of said relay means and said second circuit, said stationary contacts being arranged to be closed periodically by said bridging contact, means for attaching said stationary contacts to the housing of said motor in a position adjustable with respect to the shaft of said motor, an arcuate zero center scale, means for indicating on said scale the adjustment of said stationary contacts, a holding coil for said relay means, a ballistic galvanometer, an electrical resistance, an electrical inductance, said galvanometer, said resistance and said inductance being arranged in series circuit and being connected across said voltage source with said relay means therebetween.

2. In a system for testing electrical apparatus, an alternating voltage source, a circuit connecting said apparatus with said voltage source, relay means for controlling the continuity of said circuit, means for energizing said relay means, a circuit breaker for controlling said relay energizing means, a synchronous motor and means for energizing it from said alternating current source, said relay energizing means including a controlling switch, means operable by said motor for periodically closing said switch at a predetermined rotary position of said motor to close said relay means at a predetermined point in the cycle of said alternating voltage source, and a holding circuit for said relay means.

3. In a system for testing electrical apparatus, an alternating voltage source, a circuit for connecting said apparatus with said voltage source, relay means for controlling the continuity of said circuit, means for energizing said relay means, a circuit breaker for controlling said relay energizing means, a synchronous motor and means for energizing it from said alternating current source, said relay energizing means including a controlling switch, means operable by said motor for periodically closing said switch at an adjustable rotary position of said motor to close said relay means at a corresponding point in the cycle of said alternating voltage source, a holding circuit for said relay means, a ballistic galvanometer, and means connecting said galvanometer for energization by said voltage source through said relay means to determine the point in the cycle of said voltage source at which said relay means is closed.

JOHN P. GEBELEIN.